(12) United States Patent
Pai

(10) Patent No.: US 8,132,502 B2
(45) Date of Patent: Mar. 13, 2012

(54) CUTTING DEVICE FOR BLOCK-SHAPED FOOD

(76) Inventor: Chung-Jen Pai, Taipei Hsien (TW)

( * ) Notice: Subject to any disclaimer, the term of this patent is extended or adjusted under 35 U.S.C. 154(b) by 693 days.

(21) Appl. No.: 12/257,449

(22) Filed: Oct. 24, 2008

(65) Prior Publication Data

US 2010/0101434 A1 Apr. 29, 2010

(51) Int. Cl.
*A47J 43/00* (2006.01)
(52) U.S. Cl. .......................................... 99/537
(58) Field of Classification Search ....................... 99/537
See application file for complete search history.

(56) References Cited

U.S. PATENT DOCUMENTS

| | | | | |
|---|---|---|---|---|
| 5,865,384 | A * | 2/1999 | Pai | 241/93 |
| 7,137,581 | B2 * | 11/2006 | Takayama et al. | 241/169.1 |
| 7,318,558 | B2 * | 1/2008 | Canegallo | 241/95 |

* cited by examiner

*Primary Examiner* — Gene Kim
*Assistant Examiner* — Amir Klayman
(74) *Attorney, Agent, or Firm* — Guice Patents PLLC

(57) ABSTRACT

The present invention relates to a cutting device for block-shaped food, comprises a container main body, a tube-shaped cutting mechanism having a grinding plate, an extruding mechanism composed by a screw rod and an extruding sheet, and a sealing cover connected to the top end of the container main body. An accommodating chamber having a polygonal cross section shape provided inside the container main body is served to accommodate block-shaped food; the tube-shaped cutting mechanism is connected to the bottom end of the container main body so the grinding plate thereof is provided adjacent to an opening at the bottom end of the container main body, and the bottom end and the top end of the screw rod are respectively fastened and pivotally connected to the grinding plate and the sealing cover, and the screw rod is screw-fitted with the extruding sheet in the accommodating chamber; when a relative movement is generated between the container main body and the cutting mechanism, the extruding sheet is downwardly moved along the screw rod, so the food is pressed toward the grinding plate and the food is cut to a power, strip or thin-sheet status; when the extruding sheet is upwardly moved along the screw rod and the resilient buckling member is buckled on the buckling flange provided inside the sealing cover, when the sealing cover is separated from the top end of the container main body, the extruding sheet is also separated from the screw rod, so block-shaped food is able to be refilled.

19 Claims, 7 Drawing Sheets

CUTTING DEVICE FOR BLOCK-SHAPED FOOD

BACKGROUND OF THE INVENTION

1. Field of the Invention

The present invention relates to a manual cutting device, more particularly to a cutting device for block-shaped food, e.g. cheese or chocolate, block-shaped food to be cut by the cutting device is able to be repeatedly refilled and is able to be cut to a power, strip or thin-sheet status.

2. Description of Related Art

In western cooking, block-shaped food, e.g. cheese or chocolate, is often cut to a power, strip or thin-sheet status and sprayed and mixed in food for enhancing flavors. A commonly-seen grinding tool is a file tool, knife sections, e.g. holes or slots, are formed by punching a metal sheet, food held in hands is repeatedly grinded on the file tool for obtaining a desired shape or status.

For ensuring hygiene and storage of food, skilled people in the arts have developed arts that block-shaped food, e.g. cheese, is provided in a container main body having a polygonal cross section, e.g. a rectangular cross section, an opening end provided at the bottom end of the container main body is sealed by a cutting mechanism; wherein the cutting mechanism includes a round plate having plural knife sections, and a ring-shaped holding cover provided at the opening at the bottom end of the container main body, a screw rod is axially and integratedly extended from the round plate, the screw rod is further screw-fitted with an extruding sheet having a shape corresponding to the cross sectional shape of the container main body. The round plate is fastened on an opening at the bottom end of the ring-shaped holding cover, so block-shaped food is able to be disposed between the round plate and the extruding sheet.

When the container main body is rotated, the extruding sheet is driven by the container main body and is downwardly moved along the screw rod, so the block-shaped food is pressed by the extruding sheet and is driven to rotate by the container main body, so the block-shaped food is cut by the knife sections of the round plate, so food having a desired shape or status is obtained.

Because the round plate of the cutting device for block-shaped food is fastened on the opening at the bottom end of the ring-shaped holding cover, effects of hygiene and storage of the food are provided. When the block-shaped food is consumed, the cutting device can not be reused and has no other choice but throwing away, so a cutting device capable of being repeatedly refilled with food after the original food is consumed can be reused is something that needs to be improved.

The U.S. Pat. No. 7,318,558 has disclosed "Devices and systems for cutting food and products originally in block form", which is composed by a container main body, a cutting mechanism provided at the opening end of the container main body and an extruding mechanism provided with respect to the cutting mechanism. The extruding mechanism has an extruding sheet having a shape corresponding to the cross sectional shape of the container main body, so the extruding sheet is able to be driven to rotate by the container main body, the extruding sheet has a central hole that is engaged with a screw rod integratedly formed and axially extended from the cutting mechanism. When a relative movement is generated between the container main body and the cutting mechanism, the extruding sheet is moved along the screw rod, and the food is pressed toward the cutting mechanism; the extruding sheet includes a pair of long holes radially extended from the central hole so an orifice of the central hole is defined; the pair of long holes define at least two partition sections provided on the extruding sheet and capable of being elastically opened and approached toward each other, when the partition sections are separated, the orifice of the central hole is expanded, so the screw rod is able to be separated from the central hole and the extruding sheet is separated from the cutting mechanism, therefore block-shaped food is able to be refilled.

In view of the structure of the extruding sheet mentioned above, a sealing status has to be obtained by engaging the screw rod and the orifice of the central hole, and a separating status has also to be obtained by expanding the orifice of the central hole for being separate from the screw rod. The described extruding sheet basically has be to made of resilient materials, e.g. plastic; during the repeated switch between the sealing and the separating statuses, the elastic of the central hole is easy to fatigue or screw teeth are likely to be damaged so a function of engaging with the screw rod is no longer provided. Therefore the described means of separating the extruding sheet and the cutting mechanism is not an effective solution for providing a function of being able to be repeatedly refilled with food.

SUMMARY OF THE INVENTION

The applicant of the present invention has devoted himself to design and commercially distribute cooking wares, with a hope to overcome the disadvantages that the described cutting device wherein elastic of the central hole of the extruding sheet is easy to fatigue and the screw teeth are therefore damaged, so the screw teeth can not be sufficiently engaged with the screw rod, and with another hope to develop another means to separate the extruding sheet of the extruding mechanism and the screw rod so block-shaped food can be refilled, after try and error, the present invention "Cutting device for block-shaped food" is provided.

One object of the present invention is to provide a cutting device for block-shaped food, and the cutting device has functions of being refilled with block-shaped food and remaining hygiene of the food without cleaning the cutting device.

For achieving the object mentioned above, one solution provided by the present invention is to provide a cutting device for block-shaped food, comprises:

a container main body, an accommodating chamber having a polygonal cross section is axially provided inside the container main body for accommodating block-shaped food;

a tube-shaped cutting mechanism, the cutting mechanism is connected to the bottom end of the container main body, so an opening at the bottom end of the container main body is adjacent to a grinding plate fastened in the cutting mechanism, and the surface of the grinding plate is protrudingly provided with plural knife sections;

an extruding mechanism, a bottom end of a screw rod is fastened on the center of the grinding plate, the top end of the screw rod is axially extended out of the accommodating chamber, an extruding sheet having a shape corresponding to the polygonal cross sectional shape of the accommodating chamber is provided inside the accommodating chamber, a screw connecting hole provide in the center of the extruding sheet is screw-fitted with the screw rod, and a resilient buckling member is axially and protrudingly provided at the periphery of the screw connecting hole; a sealing cover, the sealing cover is connected to the top end of the container main body, a shaft column is protrudingly provided at the inner wall of the top end of the sealing cover, the bottom end of the shaft column has an outward-protruding buckling flange, a shaft hole is axially provided on the shaft column for being pivotally connected to the top end of the screw rod;

wherein when a relative movement is generated between the container main body and the cutting mechanism, the extruding sheet is downwardly moved along the screw rod, so the food is pressed toward the grinding plate and the food is cut to a power, strip or thin-sheet status; when the extruding sheet is upwardly moved along the screw rod and the resilient buckling member is buckled on the buckling flange provided inside the sealing cover, when the sealing cover is separated from the top end of the container main body, the extruding sheet is also separated from the screw rod, so block-shaped food is able to be refilled.

Another object of the present invention is to provide a cutting device for block-shaped food, wherein block-shaped food is able to be refilled and an extruding sheet is able to be rapidly recovered and the service life of the cutting device is prolonged.

For achieving the object mentioned above, another solution provided by the present invention is to provide a cutting device for block-shaped food, comprises:

a container main body, an accommodating chamber having a polygonal cross section is axially provided inside the container main body for accommodating block-shaped food;

a tube shaped cutting mechanism, that cutting mechanism is connected to the bottom end of the container main body, so an opening at the bottom end of the container main body is adjacent to a grinding plate fastened in the cutting mechanism, and the surface of the grinding plate is protrudingly provided with plural knife sections;

an extruding mechanism, a bottom end of a screw rod is fastened on the center of the grinding plate, the top end of the screw rod is axially extended out of the accommodating chamber, an extruding sheet having a shape corresponding to the polygonal cross section shape of the accommodating chamber is provided inside the accommodating chamber, a screw connecting hole provide in the center of the extruding sheet is screw-fitted with the screw rod, and a resilient buckling member is axially and protrudingly provided at the periphery of the screw connecting hole; a sealing cover, the sealing cover is connected to the top end of the container main body, a shaft column is protrudingly provided at the inner wall of the top end of the sealing cover, the bottom end of the shaft column has an outward-protruding buckling flange, a shaft hole is axially provided on the shaft column for being pivotally connected to the top end of the screw rod;

a rapid recovering member, a bottom cover is provided on an opening at the bottom end of the cutting mechanism, a rotation handle is radially extended from the periphery of the bottom cover and the outer end of the rotation handle is provided with a holding button;

wherein when a relative movement is generated between the container main body and the cutting mechanism, the extruding sheet is downwardly moved along the screw rod, so the food is pressed toward the grinding plate and the food is cut to a power, strip or thin sheet status; when the holding button of the rotation handle is rotated, the cutting mechanism and the screw rod are driven to rotate by the bottom cover, so the extruding sheet is upwardly moved along the screw rod, and the resilient buckling member is buckled on the buckling flange provided inside the sealing cover, when the sealing cover is separated from the top end of the container main body, the extruding sheet is also separated from the screw rod, so block-shaped food is able to be refilled.

DETAILED DESCRIPTION OF THE PREFERRED EMBODIMENT

Figure 1:
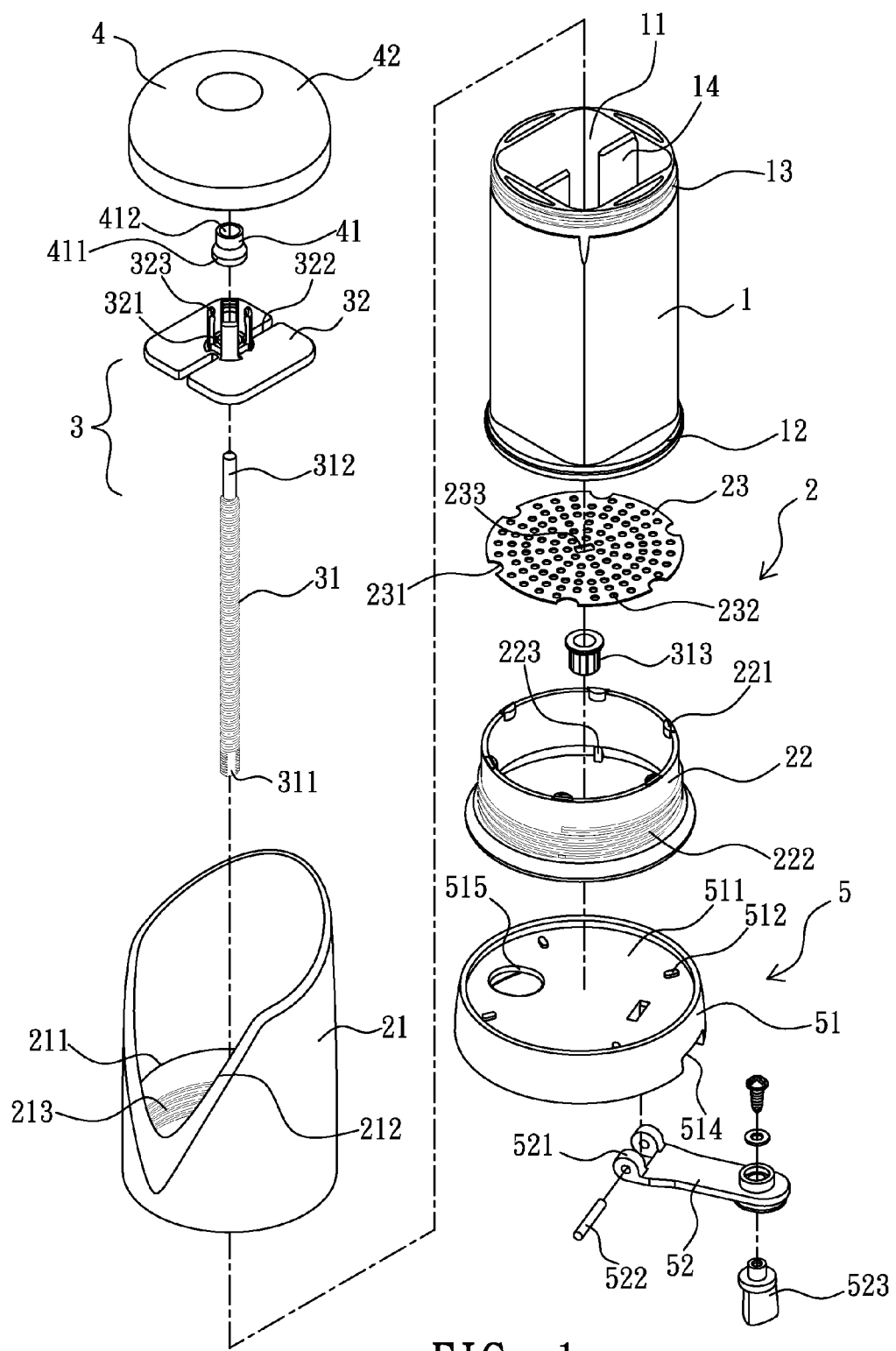
FIG. 1 is a 3D exploded view of the cutting device for block-shaped food provided by the present invention.
Figure 2:
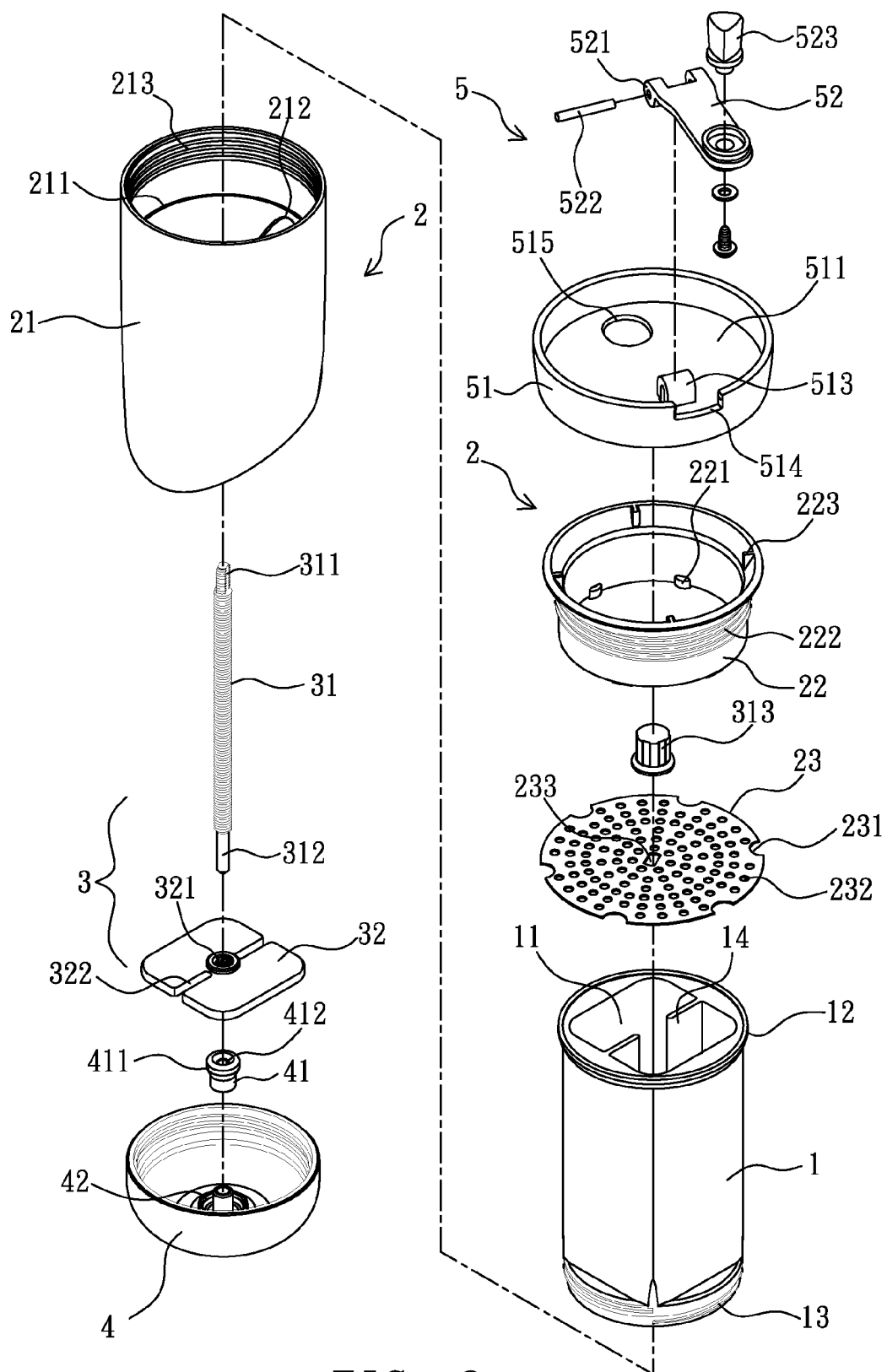
FIG. 2 is a 3D exploded view of the cutting device for block-shaped food shown in FIG. 1, being viewed from another angle.

As shown in FIG. 1 and FIG. 2, the cutting device for block-shaped food provided by the present invention is mainly composed by a container main body 1, a cutting mechanism 2, an extruding mechanism 3 and a sealing cover 4.

The container main body 1 is made of glass-like plastic material, e.g. acrylic, an accommodating chamber 11 having a polygonal cross section is axially provided inside the container main body 1, and the accommodating chamber 11 is preferable to be a rectangular accommodating chamber, for accommodating food to be cut, e.g. a block-shaped cheese or chocolate. A flange 12 is radially provided at the bottom end of the container main body 1 and served to connect to the cutting mechanism 2 so a relative movement is obtained. A top connecting orifice 13 is provided on the top end of the container main body 1, e.g. a thread section, for being connected to the sealing cover 4 and block-shaped food is able to be filled from the top connecting orifice 13.

A pair of blocking sheets 14 are respectively, longitudinally and protrudingly provided on at least one pair of inner walls of the accommodating chamber 11, so the accommodating chamber 11 is divided into two sections for respectively being filled with block-shaped food, and a screw rod 31 of the extruding mechanism 3 is provided between the gap defined by the two blocking sheets 14, so block-shaped food, e.g. cheese, is not needed to be provided with an axial hole at the center to let the screw rod 31 pass through. The feature of providing the pair of blocking sheets 14 is that when a relative movement is generated between the container main body 1 and the cutting mechanism 2, the pair of blocking sheets 14 are synchronizedly rotated, and an extruding sheet 32 is linearly moved along the screw rod 31 for pressing food, so the food can be cut to a desired shape or status by a grinding plate 23.

The cutting mechanism 2 is a tube-shaped member, comprises a holding tube 21, a bottom tube 22 and the described grinding plate 23. A blocking edge 211 is formed on the inner bottom wall of the holding tube 21, when the container main body 1 is sleeved in via the bottom end of the holding tube 21, the flange 12 of the container main body 1 is provided against the blocking edge 211. The holding tube 21 is designed to be provided with a bevel-shape, e.g. V-shaped, hollow section 212 so a cutting operation and amount of food remained is easy to be observed. A jointing section 213, e.g. a thread section, is provided at the bottom end of the holding tube 21 for being connected to the bottom tube 22.

The bottom tube 22 is served to fasten the grinding plate 23 and is further connected to the bottom end of the holding tube 21. The top end of the bottom tube 22 is protrudingly provided with plural connecting tenons 221, and plural positioning holes 231 preset on the periphery of the metal grinding plate 23 are connected to the connecting tenons 221 then a welding operation is processed via an ultrasonic means, therefore the grinding plate 23 is fastened on the bottom tube 22 and is adjacent to an opening at the bottom end of the container main body 1, so food can be cut by plural knife sections 232 protrudingly provided on the surface of the grinding plate 23 to a power, strip or thin-sheet status. A connecting section 222, e.g. a thread section, is provided at the bottom end of the bottom tube 22 and is connected to the bottom end of the holding tube 21, so when a relative movement is generated between the container main body 1 and the cutting mechanism 2, the cut food can be dispensed via an opening provided at the bottom end of the bottom tube 22.

The extruding mechanism 3 is that the screw rod 31 is fastened in the center of the grinding plate 23, and the screw rod 31 is axially extended to pass the gap defined by the two blocking sheets 14 and is pivotally connected to the sealing cover 4 provided on the top end of the container main body 1. As shown in FIG. 1 and FIG. 2, a shaft rod 311 having a non-round shape and provided at the bottom end of the screw rod 31 is passed through a plate hole 233 having a shape corresponding to the shape of the shaft rod 311 and provided on the grinding plate 23, then a rotary button 313 is served to fasten the grinding plate 23 and the shaft rod 311, so the screw rod 31 is vertically provided on top of the grinding plate 23. A core shaft 312 provided on the top end of the screw rod 31 is provided in a shaft hole 412 of a shaft column 41 protruded from the inner wall of the top end of the sealing cover 4, so the screw rod 31 is in a stable and non-tilt status.

The extruding sheet 32 is a sheet member having a shape corresponding to the polygonal cross section shape of the accommodating chamber 11, the center thereof is axially provided with a screw connecting hole 321 that is screw-fitted with the screw rod 31, and a concave slot 322 is respectively and inwardly provided with respect to the locations where the two blocking sheets 14 are disposed, so the pair of blocking sheets 14 can be received in the concave slots 322, and the extruding sheet 32 is able to be longitudinally moved along the screw rod 31 with the rotation of the container main body 1. The feature of the extruding sheet 32 is that the screw connecting hole 321 is a metal screw nut axially fastened on the extruding sheet 32 via an embedded-type injecting formation means so the screw connecting hole 321 is able to be linearly moved along the screw rod 31 for reducing wearing of screw teeth. The periphery of the extruding sheet 32 is axially and protrudingly provided with a buckling member 323 composed by plural resilient hooks.

The sealing cover 4 is a cover member having an opening at the bottom end, the shaft column 41 is connected to the inner wall of the top end of the sealing cover 4 via a welding means, and the shaft column 41 is a column member whose top end is narrower than the bottom end and is adjacently connected to a ring cover 42 whose inner surface is in an arc shape and is protrudingly provided on the inner wall of the top end of the sealing cover 4. A protruding portion at the bottom end of the column shaft 41 is defined as a buckling flange 411, so when the top end of the buckling member 323 of the extruding sheet 32 is in contact of the ring cover 42, the buckling member 323 is inwardly tilted, therefore the ring cover 42 and the buckling flange 411 of the shaft column 41 are both buckled the buckling member 323 and the extruding sheet 32 is separated from the screw rod 31, thus new food is easier to be filled. The shaft hole 412 is axially provided on the shaft column 41 so the core shaft 312 provided on the top end of the screw rod 31 can be received.

Figure 3:
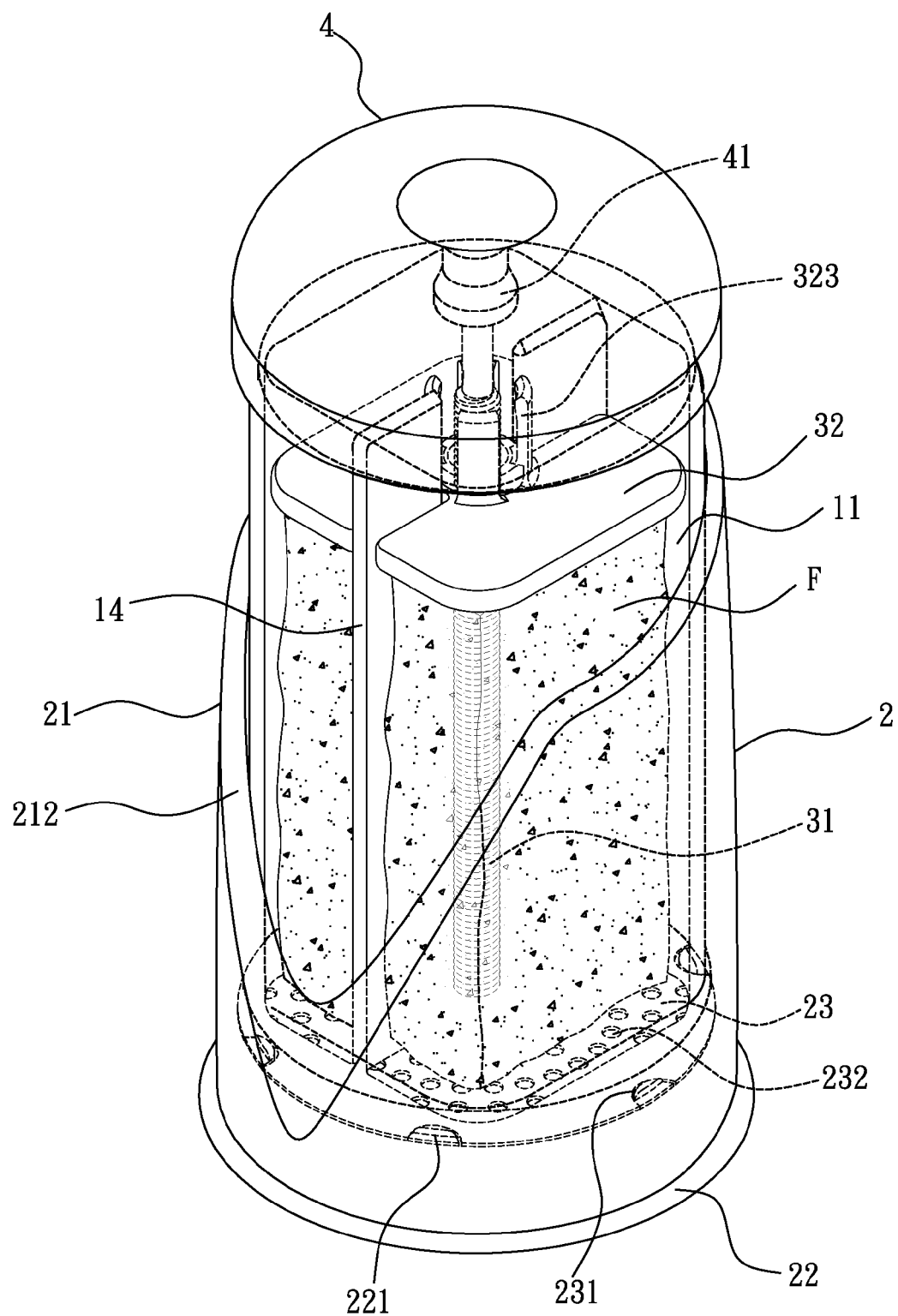
FIG. 3 is a 3D view of the cutting device provided by the present invention, after being assembled.
Figure 4:
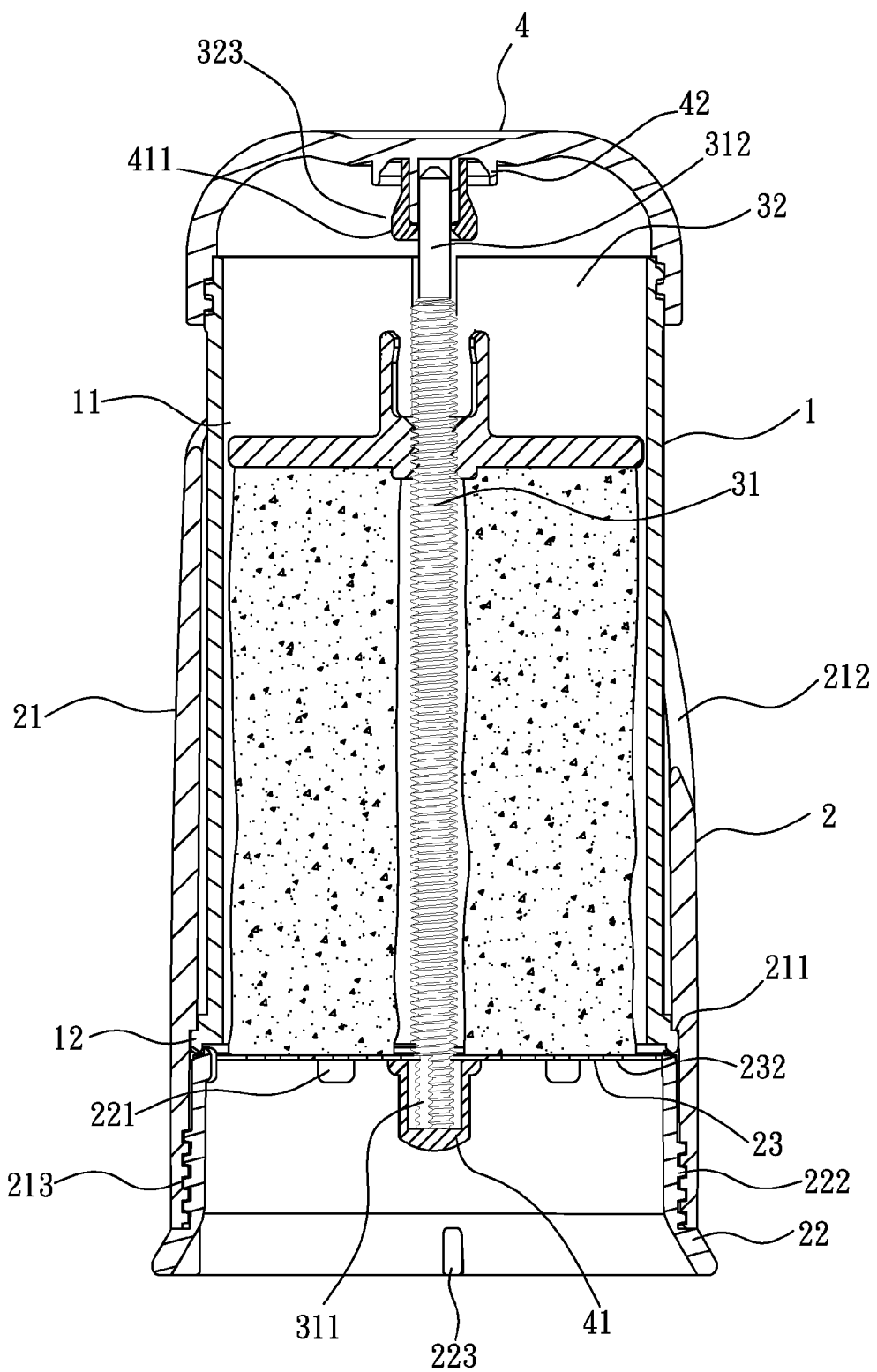
FIG. 4 is a cross sectional view of the cutting device provided by the present invention, after being assembled.

As shown in FIG. 3 and FIG. 4, which are 3D view and cross sectional view of the cutting device provided by the present invention, after being assembled, food F, e.g. cheese, is received in the accommodating chamber 11 and between the extruding sheet 32 and the grinding plate 23, when the container main body 1 is clockwise rotated, the extruding sheet 32 and the cheese F are both driven to rotate so the extruding sheet 32 is downwardly moved along the screw rod 31 and the cheese F is therefore pressed and is cut by the knife sections 232, and the cut food in a power, strip or thin-sheet status is dispensed by the bottom tube 22. When the cheese F is consumed, the container main body 1 is counterclockwise rotated and the extruding sheet 32 is upwardly moved along the screw rod 31 till the buckling member 323 thereof is moved into the inside of sealing cover 4 and is against the ring cover 42 provided at the inner wall of the top end of the sealing cover 4, so the buckling member 323 is clamped by both of the ring cover 42 and the buckling flange 411 of the shaft column 41 therefore the buckling member 323 is buckled inside the sealing cover 4.

If the sealing cover 4 is separated from the container main body 1, the extruding sheet 32 is able to be separated from the screw rod 31, thus new food is able to be filled into the accommodating chamber 11, then the sealing cover 4 is connected to the top end of the container main body 1, the food cutting operation is able to be processed again.

If the time needed for the extruding sheet 32 being upwardly moved via reversely rotating the cutting device is considered to be too long, a rapid recovering member 5 can be further provided to the cutting device provided by the present invention.

Figure 5:
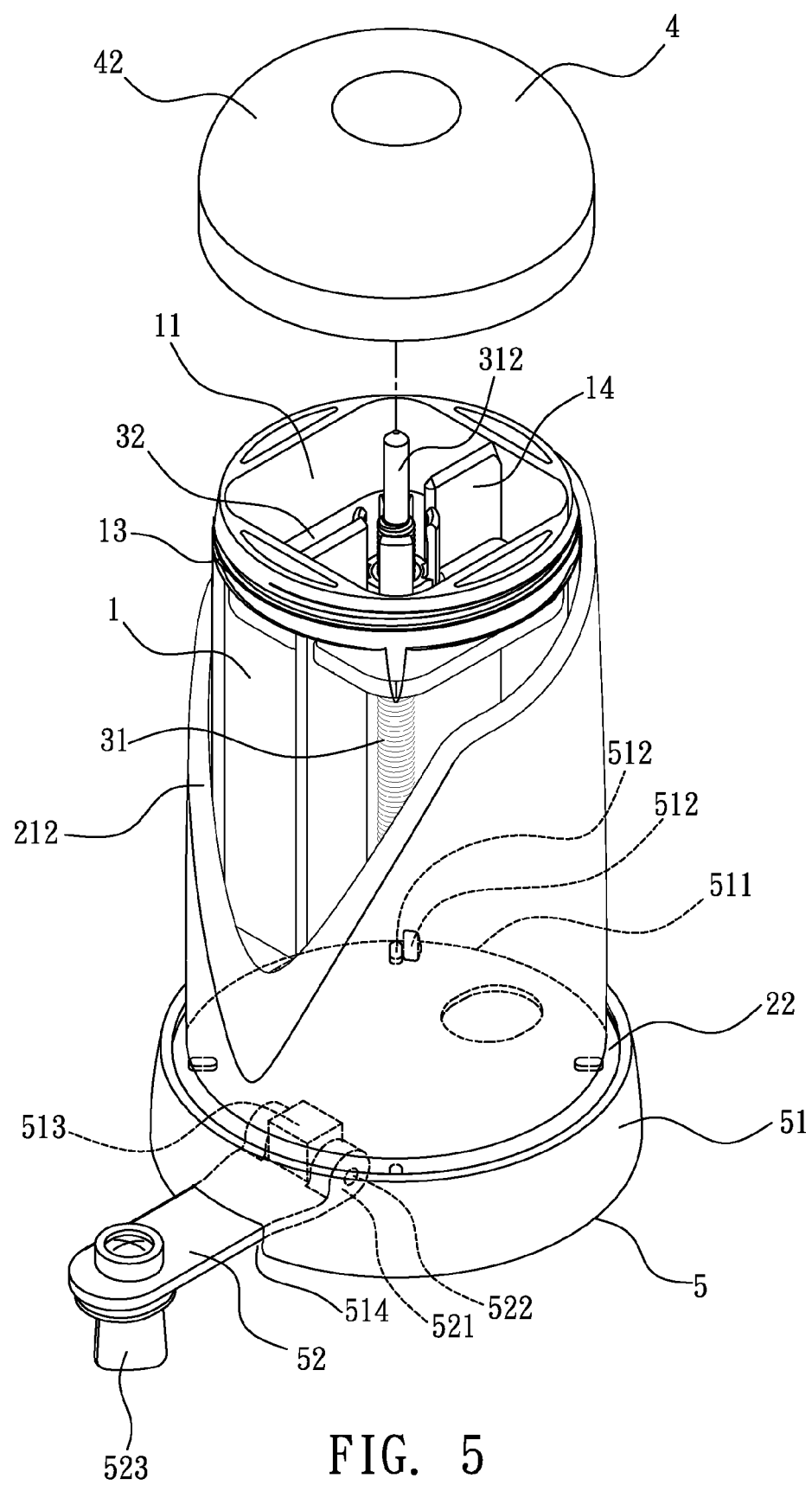
FIG. 5 is a 3D view illustrating the cutting device provided by the present invention being combined with a rapid covering member.

As shown in FIG. 5, the rapid recovering member 5 is that a bottom cover 51 is connected to the opening of the bottom tube 22, a periphery of a top end of a partition board 511 of the bottom cover 51 is protrudingly provided with plural convex teeth 512, the inner end of the horn-shaped opening of the bottom tube 22 is also protrudingly provided with plural convex tenons 223; a swing-able rotation handle 52 is pivotally provided to the periphery of the bottom surface of the partition board 511; via pins 522, two lugs 521 provided at the inner end of the rotation handle 52 are pivotally connected to a pivotal connecting block 513 protrudingly provided at the outer end of the bottom surface of the partition board 511, the portion of the bottom cover 51 adjacent to the outer end of the pivotal connecting block 513 is provided with a breach 514, so when the rotation handle 52 is outwardly rotated and the rotation handle 52 is received in the breach 514, the outer end of the rotation handle 52 is connected to a holding button 523.

Figure 6:
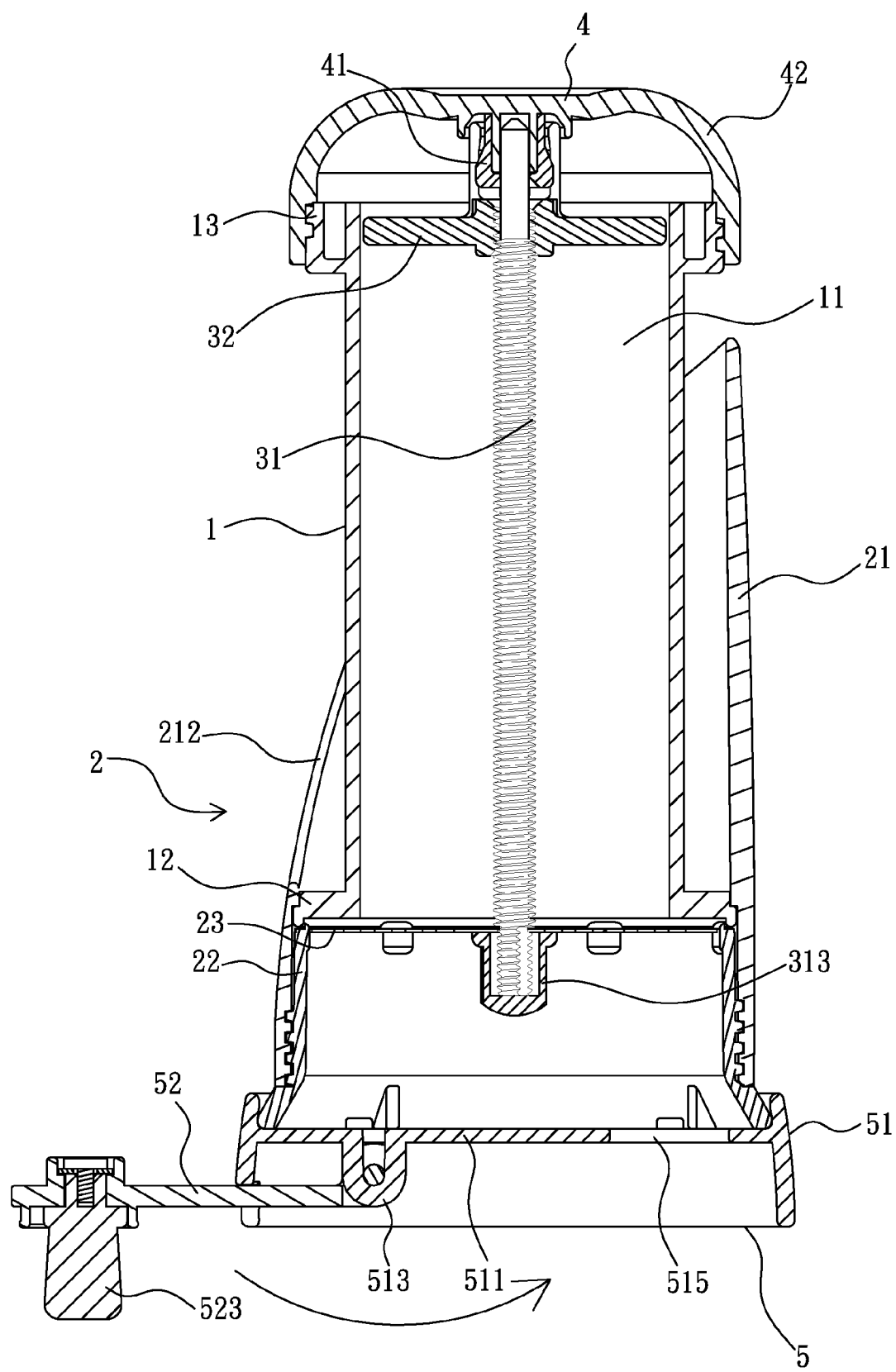
FIG. 6 is a cross sectional view illustrating the extruding sheet being buckled with the sealing cover.

When the container main body 1 is held by one hand and the holding button 523 is held by the other hand of a user and is rotated, the convex teeth 512 are pressed against the convex tenons 223 and the cutting mechanism 2 and the screw rod 31 are driven to rotate, the extruding sheet 32 is therefore upwardly moved along the screw rod 31. As shown in FIG. 6, when the extruding sheet 32 is buckled on the sealing cover 4, the rotation handle 52 can be inwardly folded so the holding button 523 is received in a button hole 515 provided on the partition board 511. When the sealing cover 4 is separated from the container main body 1 by the user, the sealing cover 4 and the extruding sheet 32 are both separated from the screw rod 31.

Figure 7:
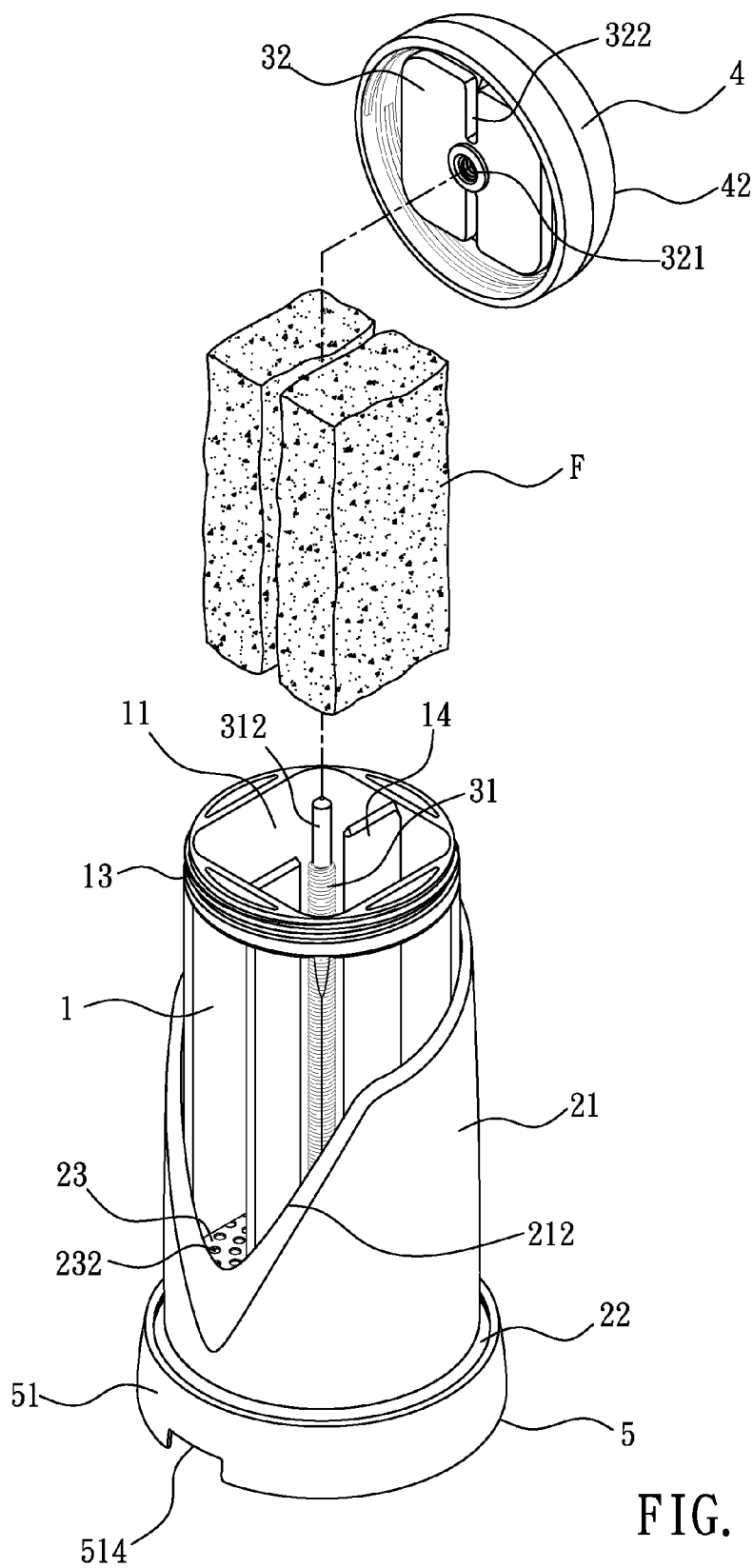
FIG. 7 is a 3D view illustrating the cutting device provided by the present invention being filled with block-shaped food.

As shown in FIG. 7, the food F can be filled in the accommodating chamber 11, then the sealing cover 4 and the extruding sheet 32 are both connected to the top end of the container main body 1, so the top end of the screw rod 31 is again pivotally connected to the sealing cover 4 and is screw-fitted with the extruding sheet 32, then the rapid recovering member 5 is removed so the food cutting operation can be processed again. The rapid recovering member 5 is a sealing cover provided at the bottom, when the cutting device provided by the present invention is not in operation, the cutting device can be stored in a refrigerator for keeping the freshness of the food, and the residual debris of the food negated from the cutting operation is prevented to be scattered in the refrigerator.

The advantages provided by the present invention are: by reversely rotating the container main body with respect to the cutting mechanism, the extruding sheet is able to be upwardly moved along the screw rod and is buckled on the sealing cover, then the sealing cover is separated from the container main body and the extruding sheet is also separated from the screw rod, the accommodating chamber of the container main body is therefore in an open status for being filled with food, so the cutting device provided by the present invention can be repeatedly refilled with food; when in operation, the extruding sheet and the accommodating chamber are not touched by hands of a user, so even without cleaning the cutting device, the hygiene of the food still can be remained; there is no slot provided between the extruding sheet and the screw rod, so the engaging effect can be ensured and the service life of the cutting device is therefore prolonged; a rapid recovering member can be further provided to the bottom end of the cutting mechanism, so the extruding sheet is able to be rapidly and upwardly moved and buckled at the outer end of the sealing cover, meanwhile the rapid recovering member can also be served as a sealing cover provided at the bottom end of the cutting device, so when the cutting device is stored in a refrigerator, the freshness of the food can be remained and the residual food generated from the cutting operation is prevented from being scattered in the refrigerator.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutting device for block-shaped food, comprises:
   a container main body, an accommodating chamber having a polygonal cross section is axially provided inside the container main body for accommodating block-shaped food;
   a tube-shaped cutting mechanism, the cutting mechanism is connected to the bottom end of the container main body, so an opening at the bottom end of the container main body is adjacent to a grinding plate fastened in the cutting mechanism, and the surface of the grinding plate is protrudingly provided with plural knife sections;
   an extruding mechanism, a bottom end of a screw rod is fastened on the center of the grinding plate, the top end of the screw rod is axially extended out of the accommodating chamber, an extruding sheet having a shape corresponding to the polygonal cross sectional shape of the accommodating chamber is provided inside the accommodating chamber, a screw connecting hole provide in the center of the extruding sheet is screw-fitted with the screw rod, and a resilient buckling member is axially and protrudingly provided at the periphery of the screw connecting hole;
   a sealing cover, the sealing cover is connected to the top end of the container main body, a shaft column is protrudingly provided at the inner wall of the top end of the sealing cover, the bottom end of the shaft column has an outward-protruding buckling flange, a shaft hole is axially provided on the shaft column for being pivotally connected to the top end of the screw rod;
   wherein when a relative movement is generated between the container main body and the cutting mechanism, the extruding sheet is downwardly moved along the screw rod, so the food is pressed toward the grinding plate and the food is cut to a power, strip or thin-sheet status;
   wherein the extruding sheet is movable between a first position and a second position,
   wherein, when the extruding sheet is located in the first position, the shaft column is connected to an inside of the sealing cover, the resilient buckling member of the extruding sheet is connected to the buckling flange of the shaft column, and when the sealing cover is separated from the top end of the container main body, the extruding sheet is separated from the screw rod and the extruding sheet is connected to the sealing cover by the buckling flange of the shaft column, so block-shaped food is able to be refilled;
   wherein, when the extruding sheet is located in the second position, the shaft column is connected to an inside of the sealing cover, the resilient buckling member of the extruding sheet is spaced apart from the buckling flange of the shaft column, and when the sealing cover is separated from the top end of the container main body, the extruding sheet is threadedly connected to the screw rod and is separated from the sealing cover.

2. The cutting device for block-shaped food as claimed in claim 1, wherein the shaft column is adjacently connected to a ring cover protrudingly provided in the inner wall of the top end of the sealing cover, the inner side of the ring cover is in an arc shape, so when the top end of the buckling member of the extruding sheet is in contact with the arc-shaped surface, the buckling member is inwardly tilted, so the buckling member is buckled by both of the ring cover and the buckling flange of the shaft column.

3. The cutting device for block-shaped food as claimed in claim 1, wherein the buckling member is composed by plural resilient hooks.

4. The cutting device for block-shaped food as claimed in claim 1, wherein the screw connecting hole is that a metal screw nut axially fastened on the center of the extruding sheet via an embedded-type injecting formation means so as to be screw-fitted with the screw rod made of metal.

5. The cutting device for block-shaped food as claimed in claim 1, wherein a shaft rod having a non-round shape and provided at the bottom end of the screw rod is passed through a plate hole having a shape corresponding to the shape of the shaft rod and provided on the grinding plate, then a rotary button is served to fasten the grinding plate and the shaft rod, so the screw rod is vertically provided on top of the grinding plate.

6. The cutting device for block-shaped food as claimed in claim 1, wherein a flange is radially provided at the bottom end of the container main body for being connected to the tube-shaped cutting mechanism, the cutting mechanism is composed by a holding tube and a bottom tube, a blocking edge is provided inside of the holding tube for being provided against the flange, and the grinding plate is fastened on the top end of the bottom tube and is adjacent to an opening at the bottom end of the container main body.

7. The cutting device for block-shaped food as claimed in claim 6, wherein the top end of the bottom tube is protrudingly provided with plural connecting tenons, and plural positioning holes preset on the periphery of the grinding plate are connected to the connecting tenons then a welding operation is processed, therefore the grinding plate is fastened on the top end of the bottom tube.

8. The cutting device for block-shaped food as claimed in claim 6, wherein the holding tube is provided with a bevel hollow section.

9. The cutting device for block-shaped food as claimed in claim 1, wherein a pair of blocking sheets are respectively, longitudinally and protrudingly provided on at least one pair of inner walls of the accommodating chamber, so the accommodating chamber is divided into two sections, a concave slot is respectively formed on the extruding sheet with respect to the locations where the blocking sheets are provided so as to receive the pair of blocking sheets, and the screw rod passes through a gap defined between the two blocking sheets.

10. A cutting device for block-shaped food, comprises:
a container main body, an accommodating chamber having a polygonal cross section is axially provided inside the container main body for accommodating block-shaped food;
a tube shaped cutting mechanism, that cutting mechanism is connected to the bottom end of the container main body, so an opening at the bottom end of the container main body is adjacent to a grinding plate fastened in the cutting mechanism, and the surface of the grinding plate is protrudingly provided with plural knife sections;
an extruding mechanism, a bottom end of a screw rod is fastened on the center of the grinding plate, the top end of the screw rod is axially extended out of the accommodating chamber, an extruding sheet having a shape corresponding to the polygonal cross section shape of the accommodating chamber is provided inside the accommodating chamber, a screw connecting hole provide in the center of the extruding sheet is screw-fitted with the screw rod, and a resilient buckling member is axially and protrudingly provided at the periphery of the screw connecting hole;
a sealing cover, the sealing cover is connected to the top end of the container main body, a shaft column is protrudingly provided at the inner wall of the top end of the sealing cover, the bottom end of the shaft column has an outward-protruding buckling flange, a shaft hole is axially provided on the shaft column for being pivotally connected to the top end of the screw rod;
a rapid recovering member, a bottom cover is provided on an opening at the bottom end of the cutting mechanism, a rotation handle is radially extended from the periphery of the bottom cover and the outer end of the rotation handle is provided with a holding button;
wherein when a relative movement is generated between the container main body and the cutting mechanism, the extruding sheet is downwardly moved along the screw rod, so the food is pressed toward the grinding plate and the food is cut to a power, strip or thin sheet status; when the holding button of the rotation handle is rotated, the cutting mechanism and the screw rod are driven to rotate by the bottom cover, so the extruding sheet is upwardly moved along the screw rod, and the resilient buckling member is buckled on the buckling flange provided inside the sealing cover, when the sealing cover is separated from the top end of the container main body, the extruding sheet is also separated from the screw rod, so block-shaped food is able to be refilled;
wherein the bottom cover has a partition board, a periphery of a top of the partition board is provided with a plurality of convex teeth and the inner end of the horn-shaped opening of the bottom tube is protrudingly provided with a plurality of convex tenons, when the bottom cover is rotated, the plurality of convex teeth of the partition board of the bottom cover engaging the plurality of convex tenons of the bottom tube and the bottom cover rotating the cutting mechanism;
wherein the extruding sheet is movable between a first position and a second position,
wherein, when the extruding sheet is located in the first position, the shaft column is connected to an inside of the sealing cover, the resilient buckling member of the extruding sheet is connected to the buckling flange of the shaft column, and when the sealing cover is separated from the top end of the container main body, the extruding sheet is separated from the screw rod and the extruding sheet is connected to the sealing cover by the buckling flange of the shaft column, so block-shaped food is able to be refilled;
wherein, when the extruding sheet is located in the second position, the shaft column is connected to an inside of the sealing cover, the resilient buckling member of the extruding sheet is spaced apart from the buckling flange of the shaft column, and when the sealing cover is separated from the top end of the container main body, the extruding sheet is threadedly connected to the screw rod and is separated from the sealing cover.

11. The cutting device for block-shaped food as claimed in claim 10, wherein the shaft column is adjacently connected to a ring cover protrudingly provided in the inner wall of the top end of the sealing cover, the inner side of the ring cover is in an arc shape, so when the top end of the buckling member of the extruding sheet is in contact with the arc-shaped surface, the buckling member is inwardly tilted, so the buckling member is buckled by both of the ring cover and the buckling flange of the shaft column.

12. The cutting device for block-shaped food as claimed in claim 10, wherein the buckling member is composed by plural resilient hooks.

13. The cutting device for block-shaped food as claimed in claim 10, wherein the screw connecting hole is that a metal screw nut axially fastened on the center of the extruding sheet via an embedded-type injecting formation means so as to be screw-fitted with the screw rod made of metal.

14. The cutting device for block-shaped food as claimed in claim 10, wherein a shaft rod having a non-round shape and provided at the bottom end of the screw rod is passed through a plate hole having a shape corresponding to the shape of the shaft rod and provided on the grinding plate, then a rotary button is served to fasten the grinding plate and the shaft rod, so the screw rod is vertically provided on top of the grinding plate.

15. The cutting device for block-shaped food as claimed in claim 10, wherein the inner end of the rotation handle is pivotally connected to a pivotal connecting block protrudingly provided at the outer end of the bottom surface of the partition board, the portion of the bottom cover adjacent to the outer end of the pivotal connecting block is provided with a breach, so when the rotation handle is outwardly rotated and the rotation handle is received in the breach; when the rotation handle is inwardly folded, the holding button of the rotation handle is received in a button hole provided on the partition board.

16. The cutting device for block-shaped food as claimed in claim 10, wherein a flange is radially and provided at the bottom end of the container main body for being connected to the tube-shaped cutting mechanism, the cutting mechanism is composed by a holding tube and a bottom tube, a blocking edge is provided inside of the holding tube for being provided against the flange, and the grinding plate is fastened on the top end of the bottom tube and is adjacent to an opening at the bottom end of the container main body.

17. The cutting device for block-shaped food as claimed in claim 16, wherein the top end of the bottom tube is protrudingly provided with plural connecting tenons, and plural positioning holes preset on the periphery of the grinding plate are connected to the connecting tenons then a welding operation is processed, therefore the grinding plate is fastened on the top end of the bottom tube.

18. The cutting device for block-shaped food as claimed in claim 16, wherein the holding tube is provided with a bevel hollow section.

19. The cutting device for block-shaped food as claimed in claim 10, wherein a pair of blocking sheets are respectively, longitudinally and protrudingly provided on at least one pair of inner walls of the accommodating chamber, so the accommodating chamber is divided into two sections, a concave slot is respectively formed on the extruding sheet with respect to the locations where the blocking sheets are provided so as to receive the pair of blocking sheets, and the screw rod passes through a gap defined between the two blocking sheets.

\* \* \* \* \*